United States Patent
Chan et al.

(10) Patent No.: US 7,155,609 B2
(45) Date of Patent: Dec. 26, 2006

(54) KEY EXCHANGE MECHANISM FOR STREAMING PROTECTED MEDIA CONTENT

(75) Inventors: Shannon J. Chan, Bellevue, WA (US); David M. Maymudes, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 09/882,810

(22) Filed: Jun. 14, 2001
(Under 37 CFR 1.47)

(65) Prior Publication Data

US 2003/0009668 A1 Jan. 9, 2003

(51) Int. Cl.
*G06F 12/14* (2006.01)
*H04L 9/00* (2006.01)

(52) U.S. Cl. .................. 713/171; 380/201; 380/277; 380/1; 725/25; 386/1

(58) Field of Classification Search ............. 713/171; 380/231, 201, 277; 725/25; 386/1; 360/1
See application file for complete search history.

(56) References Cited

U.S. PATENT DOCUMENTS

| | | | |
|---|---|---|---|
| 6,055,314 A * | 4/2000 | Spies et al. ............ 380/228 |
| 6,272,283 B1 * | 8/2001 | Nguyen .................. 386/94 |
| 6,314,518 B1 * | 11/2001 | Linnartz ................ 713/176 |
| 6,405,203 B1 * | 6/2002 | Collart .................. 707/10 |
| 6,546,193 B1 * | 4/2003 | Um et al. ............... 386/94 |
| 6,636,689 B1 * | 10/2003 | Stebbings ............... 386/94 |
| 6,802,003 B1 * | 10/2004 | Gross et al. ............ 713/175 |
| 7,003,674 B1 * | 2/2006 | Hamlin .................. 713/193 |
| 2001/0042043 A1 * | 11/2001 | Shear et al. ............. 705/51 |
| 2002/0015494 A1 * | 2/2002 | Nagal et al. ............ 380/201 |

FOREIGN PATENT DOCUMENTS

WO  WO 00/59222  * 10/2000

OTHER PUBLICATIONS

"DirectShow (ActiveMovie)", http://www.compressionworks.com/directshow.htm; 1 page; last modified on Feb. 17, 1999.*
"PowerFile C20 FAQs,", http://www.dvdchanger.com/Faq/faq_pub_all.html; 4 pages; printed May 17, 2001.

* cited by examiner

*Primary Examiner*—Taghi T. Arani
(74) *Attorney, Agent, or Firm*—Lee & Hayes, PLLC

(57) ABSTRACT

In accordance with a key exchange mechanism for streaming protected media content, key exchange components on both a client device and a server device communicate with one another to pass one or more keys from a removable storage medium (e.g., a DVD) on the server device to a media content player on the client device. The communications passed between the components allow keys used by the media content player to be transferred from the removable storage medium to the player so that the player can decode the content on the storage medium.

23 Claims, 5 Drawing Sheets

KEY EXCHANGE MECHANISM FOR STREAMING PROTECTED MEDIA CONTENT

TECHNICAL FIELD

This invention relates to streaming media content, and more particularly to a key exchange mechanism for streaming protected media content.

BACKGROUND

Computers are becoming increasingly more powerful while at the same time becoming less costly. This has resulted in the promulgation of computers into many homes and businesses throughout the world. Along with this increase in computing performance and popularity has also come an increase in the number of areas in which computers are used. Where once computers were used primarily for productivity-based applications (e.g., databases, word processing, spreadsheets, and so forth), a wide range of entertainment applications have become increasingly popular.

One such entertainment application is that of media content playback, such audio/video (e.g., movies) playback. For example, many newer computers are equipped with a DVD (digital versatile disc) drive that allows the computer to read a DVD and play the audio and/or video content on the DVD via speakers and/or display devices of the computer.

One difficulty faced in distributing content on DVD has been the concern over the ability of DVD content, especially movies, to be improperly copied and/or distributed without paying appropriate fees to the owner of the content. Thus, a security protection scheme referred to as CSS (Content Scrambling System) has been devised to encrypt the content on a DVD. Various keys have been established for various manufacturers of DVD content player applications, allowing DVD content to be played back by those applications. However, without the appropriate key(s), an application cannot decrypt (and thus cannot copy in a useable form) the encrypted content.

While the CSS system works with a single-computer system (that is, where the DVD player application and the DVD drive are part of the same computer), problems can arise in multiple-computer systems. For example, currently a computer running a Windows® operating system and a DVD player application cannot play back a movie from a remote DVD source (e.g., a remote computer or a remote media server). Thus, it would be beneficial to enhance current systems to be able to play back CSS protected content in multiple-computer systems.

SUMMARY

A key exchange mechanism for streaming protected media content is described herein.

In accordance with one aspect of the mechanism, key exchange components on both a client device and a server device communicate with one another to pass one or more keys from a removable storage medium (e.g., a DVD) on the server device to a media content player on the client device. The communications passed between the components allow keys used by the media content player to be transferred from the removable storage medium to the player so that the player can decode the content on the storage medium.

DETAILED DESCRIPTION

In a network environment, CSS (Content Scrambling System) protected content on DVDs (Digital Versatile Discs) can be played back even though the DVD drive is remote from the computing device on which playback of the DVD i content occurs. This remote playback occurs without jeopardizing the integrity of the CSS security, and can operate in a variety of different operating system environments, including with any of the Windows® operating systems.

Figure 1:
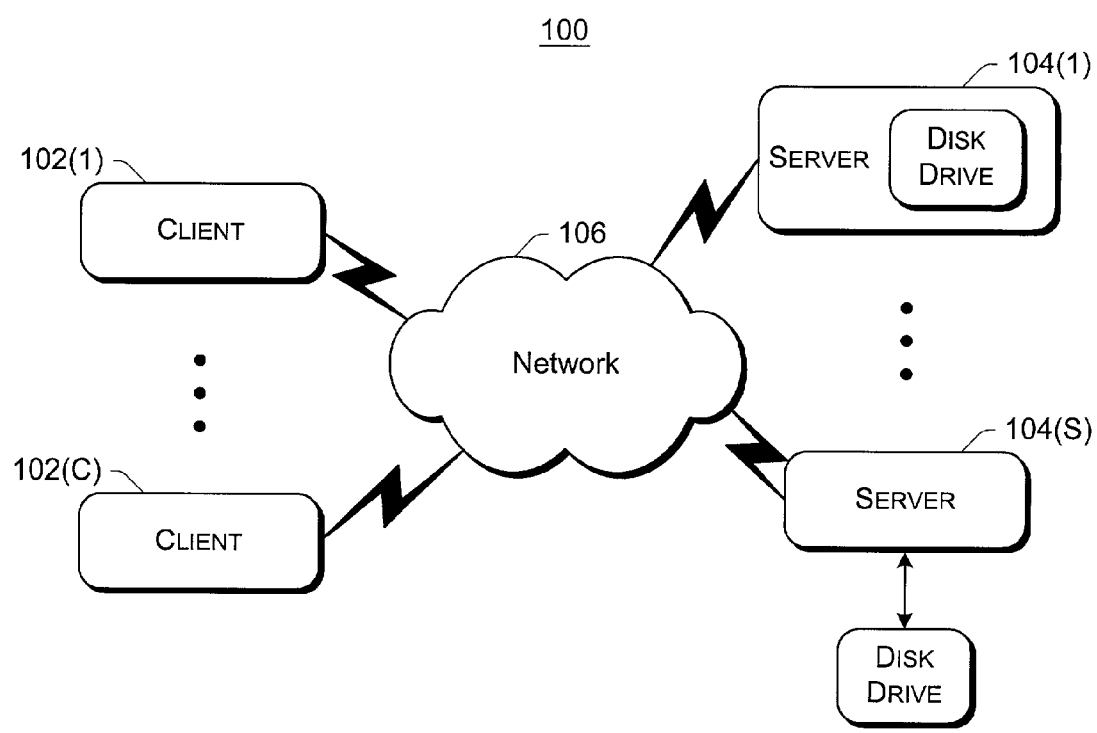
FIG. 1 is a block diagram illustrating an exemplary network environment in which media content can be streamed.

FIG. 1 is a block diagram illustrating an exemplary network environment 100. Environment 100 includes one or more client computers 102(1), . . . , 102(C), one or more server computers 104(1), . . . , 104(S), and a network 106. Network 106 represents any of a wide variety of conventional data communications networks. Network 106 may include public portions (e.g., the Internet) as well as private portions (e.g., an internal corporate Local Area Network (LAN) or a home network), as well as combinations of public and private portions. Network 106 may be implemented using any one or more of a wide variety of conventional communications media including both wired and wireless media. Any of a wide variety of communications protocols can be used to communicate data via network 106, including both public and proprietary protocols. Examples of such protocols include TCP/IP, IPX/SPX, NetBEUI, etc.

Computers 102 and 104 represent any of a wide range of computing devices, and each device may be the same or different. By way of example, computers 102 and 104 may be desktop computers, multiple-processor fileservers or workstations, media servers (e.g., disk changers or jukeboxes), laptop computers, handheld or pocket computers, personal digital assistants (PDAs), cellular phones, Internet appliances, consumer electronics devices, television set-top boxes, gaming consoles, and so forth. Client computers 102 are capable of rendering audio/video content received from a digital versatile disk (DVD), while server computers 104 include an optical disk drive capable of reading a DVD. Additionally, a particular computing device may be both a client computer 102 and a server computer 104.

Each server computer 104 includes an optical disk drive (either internal to the server or external to the server) capable of reading a DVD. Optical disks may be manually inserted into the disk drive by a user (e.g., via a slide-out media tray), or alternatively may be automatically selected by the computer (e.g., for a DVD changer or jukebox). Server device 104 can be implemented in any of a variety of manners. For example, server 104 may be a conventional computer (e.g., desktop computer, portable computer, etc.) including one or more DVD drives. Alternatively, server 104 may be a DVD jukebox or changer employing a single DVD drive or alternatively multiple DVD drives (and thus able to read and stream DVD content from multiple different DVDs concurrently).

The discussion herein primarily refers to CSS-protected DVD media content being available for playback on the client computer 102. Alternatively, different types of media content may also be used that employ similar security protection schemes. Additionally, different types of protection of DVD content other than the current CSS system can also be supported by the system and process described herein.

Figure 2:
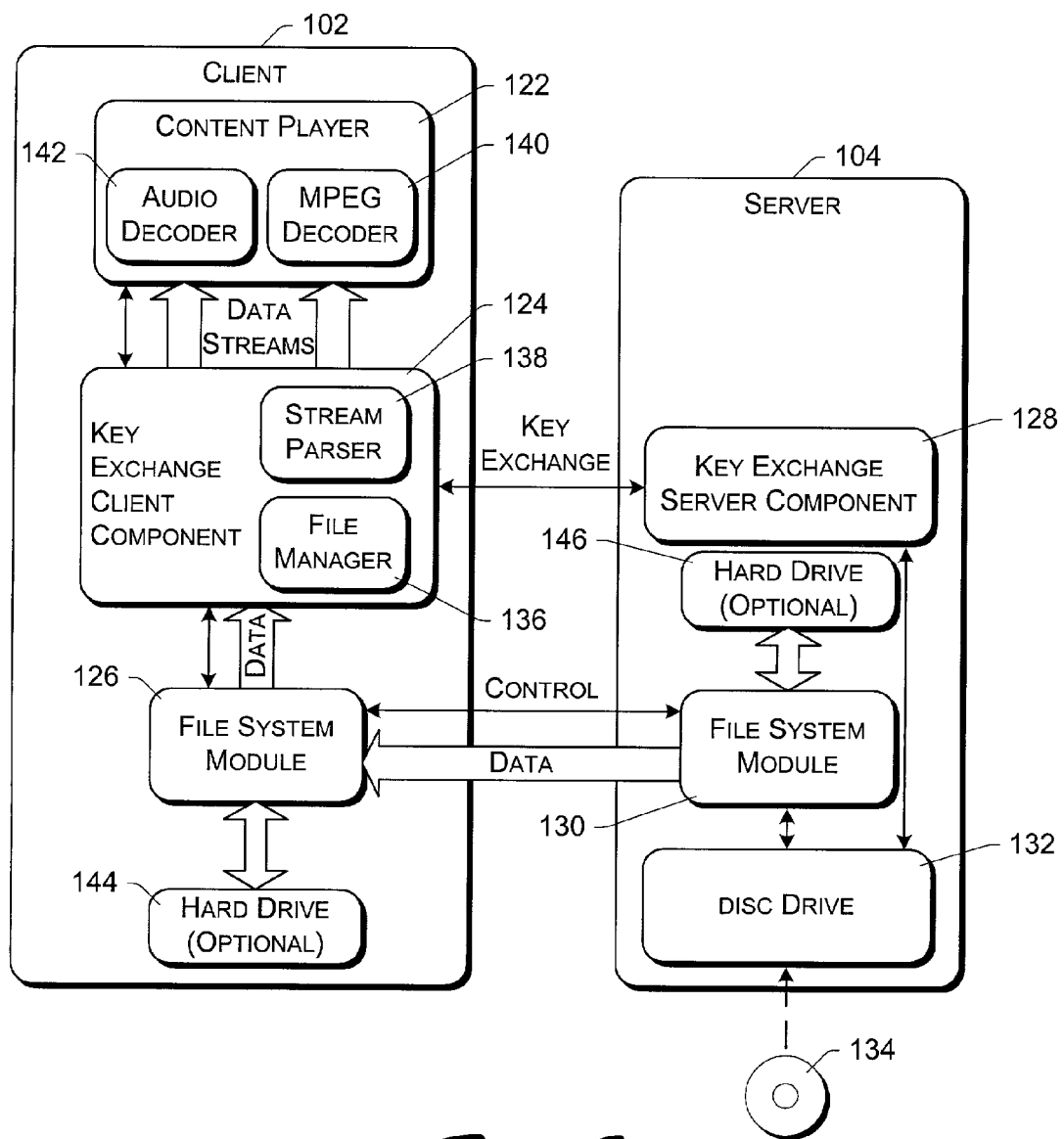
FIG. 2 illustrates exemplary client and server computing devices in additional detail.

FIG. 2 illustrates exemplary client and server computing devices in additional detail. Client device 102 represents any one of the client devices 102(1), . . . , 102(C) of FIG. 1, and server device 104 any one of the server devices 104(1), . . . , 104(S) of FIG. 1. Client device 102 includes a content player 122, a key exchange client component 124, and a file system module 126. Server device 104 includes a key exchange server component 128, a file system module 130, and a disc drive 132. During operation, content player 122 obtains information from disc (or disk) 134 being read by disc drive 132 via key exchange client and key exchange server 124 and 128, allowing the necessary CSS information to be exchanged between player 122 and drive 132 so that player 122 can decrypt data content from disc 134. Additional information regarding CSS can be obtained from Toshiba Corporation of Tokyo, Japan.

At the instigation of a file manager module 136 in key exchange client 124, file system module 126 interacts with file system module 130 to obtain the data from one or more files on a disc 134 readable by disc drive 132. The received data is communicated to key exchange client 124 where it is separated by a stream parser 138 into one or more data streams. In one implementation, key exchange client 124 is implemented as a "DVD Navigator" filter in a DirectShow® application programming interface filter graph. These data streams are then communicated to the content player 122 for decryption (as necessary) and playback. Content player 122 includes a video (MPEG-2) decoder 140 and an audio decoder 142 for decoding and rendering the video and audio streams, respectively. Content player 122 may also include additional decoders (not shown), such as a sub-picture decoder, for decoding and rendering other types of data streams received from key exchange client 124.

Figure 3:
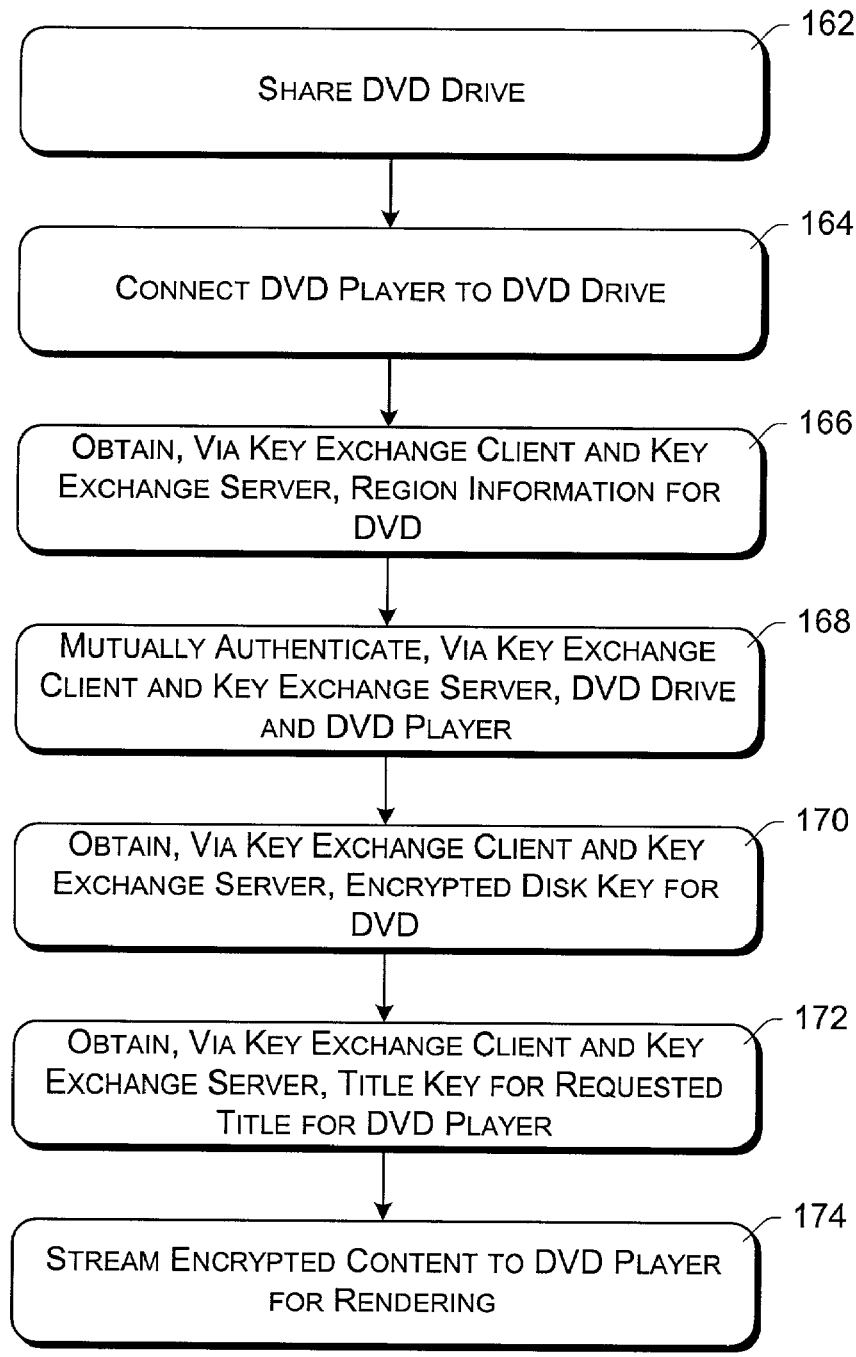
FIG. 3 is a flowchart illustrating an exemplary process for remotely accessing CSS protected DVD content.

FIG. 3 is a flowchart illustrating an exemplary process for remotely accessing CSS protected DVD content. The process 160 of FIG. 3 is carried out by the various components in client and server devices 102 and 104 of FIG. 2, and may be implemented in software. FIG. 3 is discussed with reference to comp in FIG. 2.

Initially, the DVD disc drive 132 is shared by server 104 (act 162), allowing the DVD content player 122 to connect to the drive 132 via the file system modules 126 and 130 (act 164). This sharing of drive 132 and connection to drive 132 by a remote device is performed in a conventional manner, such as conventional file sharing available from Windows®M operating systems. The sharing of drive 132 may be specific to a particular client 102, or be available generally to clients coupled to the same network as server 104 (and access may optionally be limited to only those clients that can supply the correct password). Additionally, sharing of drive 132 may be performed when a particular disk 134 is inserted into drive 132, or drive 132 may always be shared unless specifically overridden by a user (e.g., server device 104 may be pre-configured to have drive 132 shared, such as in the case of a DVD changer). Different protocols can be used for sharing drive 132, such as any of the well-known SMB (Server Message Block), CIFS (Common Internet File System), or HTTP (HyperText Transfer Protocol) protocols. Any of a variety of naming conventions can be used to identify shared DVD drives, such as the well-known UNC (Universal Naming Convention) format.

The disc drive 132 can be selected as the drive from which DVD data will be received in a variety of manners. In one implementation, file manager 136 of key exchange client 124 identifies all of the DVD drives (e.g., any drives local to client 102 as well as any shared drives that client 102 has access to) to content player 122 for display to the user. Content player 122 allows the user to select one of the drives, and an identification of the selected drive is passed to key exchange client 124. It should be noted, however, that content player 122 need merely act as a user interface allowing user-selection of a drive identified to the content player 122—content player 122 need have no knowledge that a particular identified drive is located at a remote server.

By sharing drive 132, content player 122 is able to access files and data content from disc 134 (although, in accordance with CSS, certain "private" areas of disc 134 are protected as accessible only to disc drive 132 and thus would not be accessible to content player 122). Although the data files including the DVD 18 content (e.g., a movie) are accessible to content player 122 via file system modules 126 and 130, the data files themselves are not sufficient to play back the DVD content in intelligible form because the contents are still scrambled with CSS.

Content player 122 can be any of a wide variety of conventional DVD content players, such as those available from InterVideo, Inc. of Fremont, Calif., or Cyberlink.com Corp of Fremont, Calif. Content player 122 need have no knowledge of the location of the disc drive from which it will be accessing DVD content (that is, whether the drive is a remote drive such as drive 132, or whether the drive is situated at the same computing device as content player 122). Content player 122 is shielded from knowledge of the location of the disc drive by client component 124 and file system module 126.

Region information for DVD 134 is then obtained by content player 122 via key exchange client and key exchange server 124 and 128 (act 166). DVDs are typically encoded for different regions throughout the world (e.g., the US, Canada, and US Territories are referred to as "Region 1", while Japan, Europe, South Africa, and Middle East are referred to as "Region 2"). DVD players and DVD drives are typically configured to play only DVDs encoded for a particular region. If the DVD disk is marked for all regions, then the DVD disk can be played by any DVD player and any DVD drive. If the DVD disk is not marked for all regions, then the disk region must match the DVD player region and the DVD drive region to enable playback of the DVD disk.

In one exemplary implementation, the key exchange client 124 calls DvdGetRegion to obtain the region information from DVD disk 134 in the remote DVD drive 132. Key exchange client 124 sends a DvdGetRegion request to key exchange server 128 via the RPC (Remote Procedure Call) protocol. Key exchange server 128 then calls IOCTL_DVD_GET_REGION to retrieve the region information from DVD disk 134. If DVD disk 134 is not marked for all regions, then IOCTL-DVD_GET_REGION will also verify that the disk region matches the drive region. If successful, key exchange server 128 will return the disk region information to key exchange client 124. If DVD disk 134 is not marked for all regions, then key exchange client 124 will get the AM_PROPERTY_DVD_COPY_REGION property to obtain the region information from the DVD player's audio decoder 142, video decoder 140 and sub-picture decoder. Key exchange client 124 verifies that the DVD disk region matches the decoder region before enabling playback of the DVD disk. Since the DVD disk region must match the DVD player region and DVD drive region, the key exchange mechanism fully supports the DVD region management system.

DVD drive 132 and DVD player 122 then perform, via key exchange client and server 124 and 128, mutual authentication and establish a bus key (act 168). The bus key is used to encrypt communications between DVD drive 132 and DVD player 122. If player 122 can authenticate itself as a trusted application to disc drive 132, and disc drive 132 can authenticate itself as an authentic DVD drive, the key exchange process continues. Otherwise, at least one of disc drive 132 and player 122 determines the other is not trustworthy and will not continue the key exchange process.

First in the authentication of act 168, DVD player 122 starts an authentication session with DVD drive 132. If successful, DVD drive 132 returns an authentication session ID, also known as an AGID. The AGID is used as a parameter in subsequent negotiations between DVD player 122 and DVD drive 132 to identify the key exchange process.

In one exemplary implementation, key exchange client 124 calls DvdStartSession to start an authentication session with the remote DVD drive 132. Key exchange client 124 sends the DvdStartSession request to key exchange server 128 via RPC. Key exchange server 128 calls IOCTL_DVD_START_SESSION to start an authentication session with DVD drive 132. If successful, key exchange server 128 returns the AGID (received from DVD drive 132) to key exchange client 124.

Second in the authentication of act 168, DVD player 122 sends a bus challenge key to DVD drive 132 and receives an encrypted response known as bus key 1. If successful, DVD player 122 decrypts bus key 1 to verify that it is communicating with an authentic DVD drive.

In one exemplary implementation, the DVD navigator gets the AM_PROPERTY_DVDCOPY_CHLG_KEY property to obtain a bus challenge key (which is typically, at least in part, a random or pseudo-random number) from the audio decoder 142, video decoder 140, or sub-picture decoder. Key exchange client 124 calls DvdSendKey to send the decoder's bus challenge key to the remote DVD drive 132. Key exchange client 124 sends the DvdSendKey request to key exchange server 128 via RPC. Key exchange server 128 calls IOCTL_DVD_SEND_KEY to send the bus challenge key to DVD drive 132. Key exchange client 124 calls DvdReadKey to get bus key 1 from the remote DVD drive 132. Key exchange client 124 sends the DvdReadKey request to key exchange server 128 via RPC. Key exchange server 128 calls IOCTL_DVD_READ_KEY to read bus key 1 from DVD drive 132. If successful, key exchange server 128 returns the DVD drive's bus key 1 to the key exchange client 124. Key exchange client 124 sets the AM_PROPERTY_DVD_COPY_DVDKEY1 property to provide the DVD drive's bus key 1 to the decoder. Based on the known bus challenge key and the returned encrypted response, the decoder can verify that the DVD drive is authentic if the challenge key is encrypted in the proper manner (e.g., using the proper encryption key).

Third in the authentication of act 168, DVD drive 132 sends a bus challenge to DVD player 122 and receives an encrypted response known as bus key 2. If successful, DVD drive 132 has verified that it is communicating with an authentic DVD player 122 application.

In one exemplary implementation, key exchange client 124 calls DvdReadKey to get the bus challenge key (which is typically, at least in part, a random or pseudo-random number) from the remote DVD drive 132. Key exchange client 124 sends the DvdReadKey request to key exchange server 128 via RPC. Key exchange server 128 calls IOCTL_DVD_READ_KEY to get the bus challenge key from DVD drive 132. If successful, key exchange server 128 returns the DVD drive's bus challenge key to key exchange client 124. Key exchange client 124 sets the AM_PROPERTY_DVDCOPY_CHLG_KEY property to provide the DVD decoder with the drive's bus challenge key, and gets the AM_PROPERTY_DVDCOPY_DEC_KEY2 property to read the decoder's bus key 2. Key exchange client 124 calls DVDSendKey to send the decoder's bus key 2 to the remote DVD drive 132. Key exchange client 124 sends the DvdSendKey request to key exchange server 128 via RPC. Key exchange server 128 calls IOCTL_DVD_SEND_KEY to send the decoder's bus key 2 to DVD drive 132. Based on the known bus challenge key and the returned encrypted response, the DVD drive can verify that the DVD player is authentic if the challenge key is encrypted in the proper manner (e.g., using the proper encryption key).

If mutual authentication is successful, then the DVD drive 132 and DVD player 122 establish a bus key. The bus key is used to encrypt subsequent communications between the DVD drive and DVD-Player. Additional information regarding CSS and the generation of the bus key is available from Toshiba Corporation of Tokyo, Japan. In one exemplary implementation, DVD drive 132 establishes a bus key with an audio decoder 142, video decoder 140, or sub-picture decoder within a DVD player 122 application.

Once player 122 and drive 132 are mutually authenticated, DVD content player 122 obtains the encrypted disk key for DVD disk 134 (act 170). DVD disk 134 stores an encrypted copy of the disk key for each authentic brand of DVD player 122. DVD player 122 uses DVD drive 132 to read the list of encrypted disk keys from DVD disk 134. DVD player 122 uses its own secret key to decrypt the disk key.

In one exemplary implementation, key exchange client 124 calls DvdReadKey to get the list of encrypted disk keys from the remote DVD drive 132. Key exchange client 124 sends the DvdReadKey request to key exchange server 128 via RPC. Key exchange server 128 calls IOCTL_DVD_READ_KEY to read the list of encrypted disk keys from the DVD disk 134 in DVD drive 132. If successful, key exchange server 128 returns the list of encrypted disk keys to key exchange client 124. Key exchange client 124 sets the AM_PROPERTY_DVDCOPY_DISC_KEY property to provide the audio decoder 142, video decoder 140, or sub-picture decoder with the list of encrypted disk keys. The decoder then uses its own private key to decrypt the disk key.

Each DVD disk 134 may include one or more titles. Each title is encrypted with a title key, and each title key is encrypted with the disk key. In order to play an encrypted title on the disk, DVD player 122 obtains the disk key (act 170) and the title key (act 172), uses the disk key to decrypt the title key, and then uses the title key to decrypt the title.

In one exemplary implementation, key exchange client 124 calls DvdReadTitleKey to retrieve the encrypted title key for the current title from the DVD disk 134 in remote DVD drive 132. Key exchange client 124 sends the DvdReadTitleKey request to key exchange server 128 via RPC. Key exchange server 128 calls IOCTL_DVD_READ_KEY to read the encrypted title key from the DVD disk 134 in DVD drive 132. If successful, key exchange server 128 returns the encrypted title key to key exchange client 124. Key exchange client 124 sets the AM_PROPERTY_DVD-COPY_TITLE_KEY property to provide the audio decoder 142, video decoder 140, or sub-picture decoder with the current title key. The decoder uses the disk key to decrypt the title key.

The encrypted content from DVD 134 is then streamed to DVD player 122 for rendering (act 174). This streaming occurs via the file system modules 126 and 130. DVD content is communicated from file system module 130 to file system module 126 in blocks requested by file system module 126. In one implementation these blocks have a size of 61,440 data bytes, although different implementations can employ different (larger or smaller) block sizes. Various additional control commands may also be submitted to key exchange client 124 by content player 122 (e.g., pause, fast forward, rewind, etc.). These commands are received by key exchange client 124 and communicated to file system 130 for issuance to disc drive 132 as appropriate.

Figure 4:
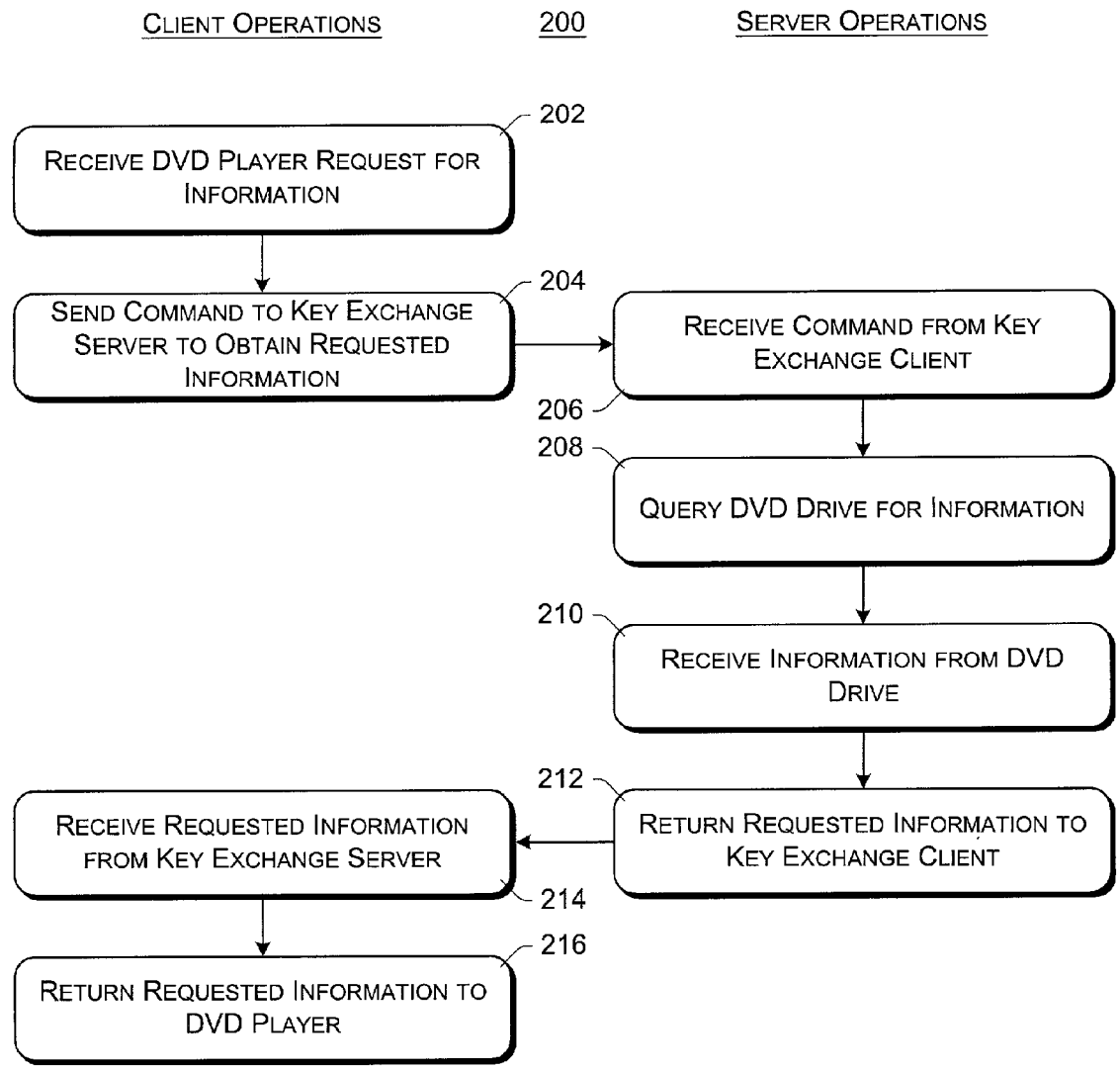
FIG. 4 is a flowchart illustrating an exemplary process for exchanging information between a DVD player and a DVD drive on two different computing devices.

FIG. 4 is a flowchart illustrating an exemplary process for exchanging information between a DVD player and a DVD drive on two different computing devices. The process 200 of FIG. 4 is carried out by the various components in client and server devices 102 and 104 of FIG. 2, and may be implemented in software. FIG. 4 is discussed with reference to components in FIG. 2. For ease of explanation, the acts performed by client device 102 are illustrated on the left-hand side of FIG. 4, while the acts performed by server device 104 are illustrated on the right-hand side of FIG. 4.

Initially, key exchange client 124 receives a request from DVD content player 122 for information (act 202). Different types of information can be requested, such as region information, authentication information (e.g., "bus" keys), disk keys, and title keys.

In one exemplary implementation, a DVD copy protection property set is supported by key exchange client 124. This property set includes property IDs and property data types used for the key exchange process. The property IDs are illustrated in Table I below while the property data types are illustrated in Table II below. Additional property IDs and data types may be included in the DVD copy protection property set, however, values that are not relevant to the key exchange process have not been described herein. Values for these properties in the DVD copy protection property set can be set or retrieved using "Set" and "Get" interfaces from the IKsPropertySet Interface, illustrated in Table III below.

TABLE I

| Property ID | Description |
| --- | --- |
| AM_PROPERTY_DVDCOPY_CHLG_KEY | Both get and set operations are supported on this property. A get operation requests the decoder to provide its bus challenge key. A set operation provides the decoder with the bus challenge key from the DVD drive. The data passed in this property will be a structure of type AM_DVDCOPY_CHLGKEY (a DVD challenge key). |
| AM_PROPERTY_DVDCOPY_DEC_KEY2 | This is a get-only property. This property requests that the decoder's bus key 2 be transferred to the DVD drive. The data passed will be a structure of type AM_DVDCOPY_BUSKEY (a DVD bus key). |
| AM_PROPERTY_DVDCOPY_DISC_KEY | Set-only property. This provides disc key. The key is a structure of type AM_DVDCOPY_DISCKEY (a DVD disc key). |
| AM_PROPERTY_DVDCOPY_DVD_KEY1 | This is a set-only property. This property provides the DVD drive bus key 1 to the decoder. The data passed will be a structure of type AM_DVDCOPY_BUSKEY (a DVD bus key). |
| AM_PROPERTY_DVDCOPY_SET_COPY_STATE | Both get and set are supported on this property. Get is called first to determine if authentication is required. The set properties are indications as to which phase of copy protection negotiation the filter is entering. The data passed will be a structure of type AM_DVDCOPY_SET_COPY_STATE (determines the copy protection state of the filter). |
| AM_PROPERTY_DVDCOPY_TITLE_KEY | This is a set-only property. This provides title key from current content. The key is a structure of type AM_DVDCOPY_TITLEKEY (a DVD title key from the current content). |
| AM_PROPERTY_DVDCOPY_REGION | Region code requests the region definition that the decoder is allowed to play in as defined by the DVD consortium. |

TABLE II

| Data Structure | Definition |
| --- | --- |
| AM_PROPERTY_DVDCOPY_REGION | typedef struct_DVD_REGION {<br>    UCHAR CopySystem; //specifies whether the disk is copy protected<br>    UCHAR RegionData; //information about the region from decoder<br>    UCHAR SystemRegion; //information about region from DVD drive<br>    UCHAR Reserved; //Reserved<br>} DVD_REGION, *PDVD_REGION; |

TABLE II-continued

| Data Structure | Definition |
| --- | --- |
| AM_DVDCOPY_BUSKEY | typedef struct_AM_DVDCOPY_BUSKEY {<br>    BYTE BusKey[5]; //DVD drive bus key<br>    BYTE Reserved[1]; //Reserved<br>} AM_DVDCOPY_BUSKEY, *PAM_DVDCOPY_BUSKEY; |
| AM_DVDCOPY_CHLGKEY | typedef struct_AM_DVDCOPY_CHLGKEY {<br>    BYTE ChlgKey[10]; //Challenge key<br>    BYTE Reserved[2]; //Reserved<br>} AM_DVDCOPY_CHLGKEY, *PAM_DVDCOPY_CHLGKEY; |
| AM_DVDCOPY_DISCKEY | typedef struct_AM_DVDCOPY_DISCKEY {<br>    BYTE DiscKey[2048]; //DVD disc key<br>} AM_DVDCOPY_DISCKEY, *PAM_DVDCOPY_DISCKEY; |
| AM_DVDCOPY_SET_COPY_STATE | typedef struct AM_DVDCOPY_SET_COPY_STATE {<br>    ULONG DVDCopyState; //Copy protection state of the filter.<br>        Member of the AM_DVDCOPYSTATE<br>        enumerated data type.<br>} AM_DVDCOPY_SET_COPY_STATE,<br>*PAM_DVDCOPY_SET_COPY_STATE; |
| AM_DVDCOPYSTATE | typedef enum {<br>    AM_DVDCOPYSTATE_INITIALIZE,<br>    AM_DVDCOPYSTATE_INITIALIZE_TITLE,<br>    AM_DVDCOPYSTATE_AUTHENTICATION_NOT_REQUIRED,<br>    AM_DVDCOPYSTATE_AUTHENTICATION_REQUIRED,<br>    AM_DVDCOPYSTATE_DONE<br>} AM_DVDCOPYSTATE;<br>Element Definitions<br>AM_DVDCOPYSTATE_INITIALIZE-Starting a full key-exchange algorithm.<br>AM_DVDCOPYSTATE_INITIALIZE_TITLE-Starting a title key-exchange algorithm.<br>AM_DVDCOPYSTATE_AUTHENTICATION_NOT_REQUIRED-Authentication is not required.<br>AM_DVDCOPYSTATE_AUTHENTICATION_REQUIRED-Authentication required.<br>AM_DVDCOPYSTATE_DONE-Key exchange negotiation is complete. |
| AM_DVDCOPY_TITLEKEY | typedef struct AM_DVDCOPY_TITLEKEY {<br>    ULONG KeyFlags; //Key flags<br>    UCHAR TitleKey[6]; //Title key<br>    UCHAR Reserved[2]; //Reserved<br>} AM_DVDCOPY_TITLEKEY, *PAM_DVDCOPY_TITLEKEY; |

TABLE III

| Interface | Definition |
| --- | --- |
| IKsPropertySet::Get<br>(Retrieves a property identified by a property set Globally Unique Identifier (GUID) and a property ID) | Syntax<br>    HRESULT Get(<br>      REFGUID guidPropSet,<br>      DWORD dwPropID,<br>      LPVOID pInstanceData,<br>      DWORD cbInstanceData,<br>      LPVOID pPropData,<br>      DWORD cbPropData,<br>      DWORD *pcbReturned<br>    );<br>Parameters<br>    guidPropSet<br>      [in] Property set GUID.<br>    dwPropID<br>      [in] Identifier of the property within the property set.<br>    pInstanceData<br>      [out, size_is(cbInstanceData)] Pointer to instance data for the property.<br>    cbInstanceData<br>      [in] Number of bytes in the buffer to which pInstanceData points.<br>    pPropData<br>      [out, size_is(cbPropData)] Pointer to the retrieved buffer, which contains the value of the property.<br>    cbPropData<br>      [in] Number of bytes in the buffer to which pPropData points. |

TABLE III-continued

| Interface | Definition |
|---|---|
| | pcbReturned<br>    [out] Pointer to the number of bytes returned in the buffer<br>    to which pPropData points.<br>Return Value<br>    Returns an HRESULT value that depends on the implementation of the<br>    interface.<br>    The current Microsoft ® DirectShow ® implementation returns<br>    E_PROP_SET_UNSUPPORTED if the property set is not supported or<br>    E_PROP_ID_UNSUPPORTED if the property ID is not supported for<br>    the specified property set.<br>Remarks<br>    To retrieve a property, allocate a buffer which this method will then fill<br>    in. To determine the necessary buffer size, specify NULL for<br>    pPropData and zero (0) for cbPropData. This method returns the<br>    necessary buffer size in pcbReturned. |
| IKsPropertySet::Set (Sets a property identified by a property set GUID and a property ID) | Syntax<br>    HRESULT Set(<br>      REFGUID guidPropSet,<br>      DWORD dwPropID,<br>      LPVOID pInstanceData,<br>      DWORD cbInstanceData,<br>      LPVOID pPropData,<br>      DWORD cbPropData<br>    );<br>Parameters<br>    guidPropSet<br>      [in] Property set GUID.<br>    dwPropID<br>      [in] Identifier of the property within the property set.<br>    pInstanceData<br>      [out, size_is(cbInstanceData)] Pointer to instance data for the<br>      property.<br>    cbInstanceData<br>      [in] Number of bytes in the buffer to which pInstanceData points.<br>    pPropData<br>      [out, size_is(cbPropData)] Pointer to the retrieved buffer, which<br>      contains the value of the property.<br>    cbPropData<br>      [in] Number of bytes in the buffer to which pPropData points.<br>Return Value<br>    Returns an HRESULT value that depends on the implementation of the<br>    interface.<br>    The current DirectShow implementation returns<br>    E_PROP_SET_UNSUPPORTED if the property set is not supported or<br>    E_PROP_ID_UNSUPPORTED if the property ID is not supported for<br>    the specified property set. |

Based on the type of information requested, key exchange client 124 sends the appropriate command to key exchange server 128 to obtain the requested information (act 204). Key exchange server 128 receives the command from key exchange client 124 (act 206) and queries the disc drive 132 for the requested information (act 208). From the viewpoint of disc drive 132, key exchange server 128 is a DVD content player requesting the information—disc drive 132 has no knowledge that it is dealing with an intermediary or agent for a DVD content player.

In one exemplary implementation, a DeviceIoControl function is used to allow the key exchange server 128 to communicate with disc drive 132, and is illustrated in Table IV below. Additionally, the control codes of the DeviceIoControl function that are used are illustrated in Table V below.

TABLE IV

| Function | Definition |
|---|---|
| BOOL DeviceIoControl | BOOL DeviceIoControl(<br>    HANDLE hDevice,<br>    DWORD dwIoControlCode,<br>    LPVOID lpInBuffer,<br>    DWORD nInBufferSize,<br>    LPVOID lpOutBuffer,<br>    DWORD nOutBufferSize, |

TABLE IV-continued

| Function | Definition |
|---|---|
| | LPDWORD lpBytesReturned,<br>LPOVERLAPPED lpOverlapped<br>);<br>Parameters<br>  hDevice<br>    [in] Handle to the device on which to perform the operation,<br>    typically a volume, directory, file, or alternate stream.<br>  dwIoControlCode<br>    [in] Specifies the control code for the operation. This value<br>    identifies the specific operation to be performed and the type of<br>    device on which to perform it. Exemplary control codes are<br>    illustrated in Table V.<br>  lpInBuffer<br>    [in] Pointer to a buffer that contains the data required to perform<br>    the operation. This parameter can be NULL if the<br>    dwIoControlCode parameter specifies an operation that does not<br>    require input data.<br>  nInBufferSize<br>    [in] Specifies the size, in bytes, of the buffer pointed to by<br>    lpInBuffer.<br>  lpOutBuffer<br>    [out] Pointer to a buffer that receives the operation's output data.<br>    This parameter can be NULL if the dwIoControlCode parameter<br>    specifies an operation that does not produce output data.<br>  nOutBufferSize<br>    [in] Specifies the size, in bytes, of the buffer pointed to by<br>    lpOutBuffer.<br>  lpBytesReturned<br>    [out] Pointer to a variable that receives the size, in bytes, of the<br>    data stored into the buffer pointed to by lpOutBuffer.<br>  lpOverlapped<br>    [in] Pointer to an OVERLAPPED structure. If hDevice was<br>    opened with the FILE_FLAG_OVERLAPPED flag,<br>    lpOverlapped must point to a valid OVERLAPPED structure. In<br>    this case, the operation is performed as an overlapped<br>    (asynchronous) operation. If the device was opened with<br>    FILE_FLAG_OVERLAPPED and lpOverlapped is NULL, the<br>    function fails in unpredictable ways. If hDevice was opened<br>    without specifying the FILE_FLAG_OVERLAPPED flag,<br>    lpOverlapped is ignored and DeviceIoControl does not return<br>    until the operation has been completed, or an error occurs.<br>Return Value<br>  If the function succeeds, the return value is nonzero.<br>  If the function fails, the return value is zero.<br>Remarks<br>  If hDevice was opened with FILE_FLAG_OVERLAPPED and the<br>  lpOverlapped parameter points to an OVERLAPPED structure, the<br>  operation is performed as an overlapped (asynchronous) operation. In<br>  this case, the OVERLAPPED structure contains a handle to a manual-<br>  reset event object created by a call to a CreateEvent function. |

TABLE V

| Control Code | Description |
|---|---|
| IOCTL_DVD_START_SESSION | Starts an authentication session and returns an authentication session ID known as an AGID. |
| IOCTL_DVD_READ_KEY | Reads a bus challenge key or bus key 1 or the list of encrypted disk keys or an encrypted title key from the DVD drive. |
| IOCTL_DVD_SEND_KEY | Sends a bus challenge key or bus key 2 to the DVD drive. |
| IOCTL_DVD_END_SESSION | Ends an authentication session. |
| IOCTL_DVD_GET_REGION | Reads the region information from the DVD disk in the DVD drive. |

Key exchange server 128 receives the requested information from disc drive 132 (act 210) and returns the information to the client 124 (act 212). Key exchange client 124 receives the information from key exchange server 128 (act 214) and returns the requested information to DVD player 122 (act 216). DVD player 122 is thus able to interact, via the key exchange client and key exchange server 124 and 128, with disc drive 132 as if player 122 and drive 132 were situated at the same device.

Returning to FIG. 2, in one implementation key exchange client and key exchange server 124 and 128 are implemented using the well-known remote procedure call (RPC) protocol. In this implementation, key exchange server 128 is implemented as an RPC server to which key exchange client 124 can communicate command messages. An exemplary implementation of the interface provided by key exchange server 128 is shown in the following code:

```
interface DvdRpc
{
  HRESULT DvdGetRegion([in] LPCWSTR pszRoot,
    [out] DVD_REGION *pRegion);
  HRESULT DvdStartSession ([in] LPCWSTR pszRoot,
    [in] ULONG KeyLength, [out] ULONG *pSessionId);
  HRESULT DvdSendKey ([in] LPCWSTR pszRoot, [in]
    ULONG KeyLength, [in, out, size_is (KeyLength)]BYTE
    *pBuffer);
  HRESULT DvdReadKey ([in] LPCWSTR pszRoot, [in]
    ULONG KeyLength, [in, out, size is (KeyLength)] BYTE
    *pBuffer);
  HRESULT DvdReadTitleKey ([in] LPCWSTR pszfile,
    [in] ULONG KeyLength, [in, out, size_is (KeyLength)]
    BYTE *pBuffer);
  HRESULT DvdEndSession ([in] LPCWSTR pszRoot,
    [in] ULONG SessionID);
}
```

The "DvdGetRegion" command is a request to key exchange server 128 to obtain the region information (returned in the *pRegion parameter) from the DVD (the path to or location of the DVD is identified by the pszRoot parameter). The "DvdStartSession" and "DvdEndSession" commands define the beginning and ending of a key exchange session between the key exchange client and key exchange server 124 and 128 for a DVD having a path or location identified by the pszRoot parameter and an AGID identified by the *pSessionId or SessionID parameter and having a size identified by the KeyLength parameter. The "DvdSendKey" command sends a bus challenge key or bus key 2 (identified by the *pBuffer parameter having a size identified by the KeyLength parameter) to the remote DVD drive, with the pszRoot parameter identifying the path or location of the DVD. The "DvdReadKey" command reads the bus challenge key or bus key 1, or the list of encrypted disk keys, (identified by the *pBuffer parameter having a size identified by the KeyLength parameter) from the remote DVD drive, with the pszRoot parameter identifying the path or location of the DVD. The "DVDReadTitleKey" command reads an encrypted title key (identified by the *pBuffer parameter having a size identified by the KeyLength parameter) from the remote DVD drive, with the pszFile parameter identifying the file on the DVD that the command corresponds to.

Alternatively, other protocols besides the RPC protocol may be used to communicate commands and results between client and server components 124 and 128. For example, the well-known SOAP (Simple Object Access Protocol) protocol may be used.

Various enhancements may also be made to client device 102 and/or server device 104 to improve the performance of streaming DVD content from server 104 to client 102. In one implementation, one or both of client 102 and server 104 includes an optional hard drive (drives 144 and 146, respectively) or other mass storage device. The use of a hard drive allows data from disc 134 to be cached either at server 104 (by hard drive 146) or at client 102 (by hard drive 144). Hard drives typically operate at faster speeds than optical disc drives, so caching data from disc 134 at server 104 could allow server 104 to handle streaming to more clients 102 concurrently than without such caching. Additionally, by caching data at client 102, latencies and uncertainties in communicating the data across the network can be accounted for.

An additional enhancement that can be made is referred to as "overlapped I/O". Overlapped I/O allows client component 124, via file system module 126, to request multiple read requests (requests for a block (s) of data from disc 134) before the results from one of those read requests is returned. Thus, a continuous flow of read commands can be issued without waiting for the results of a previous read request to be returned prior to issuing another read request.

Figure 5:
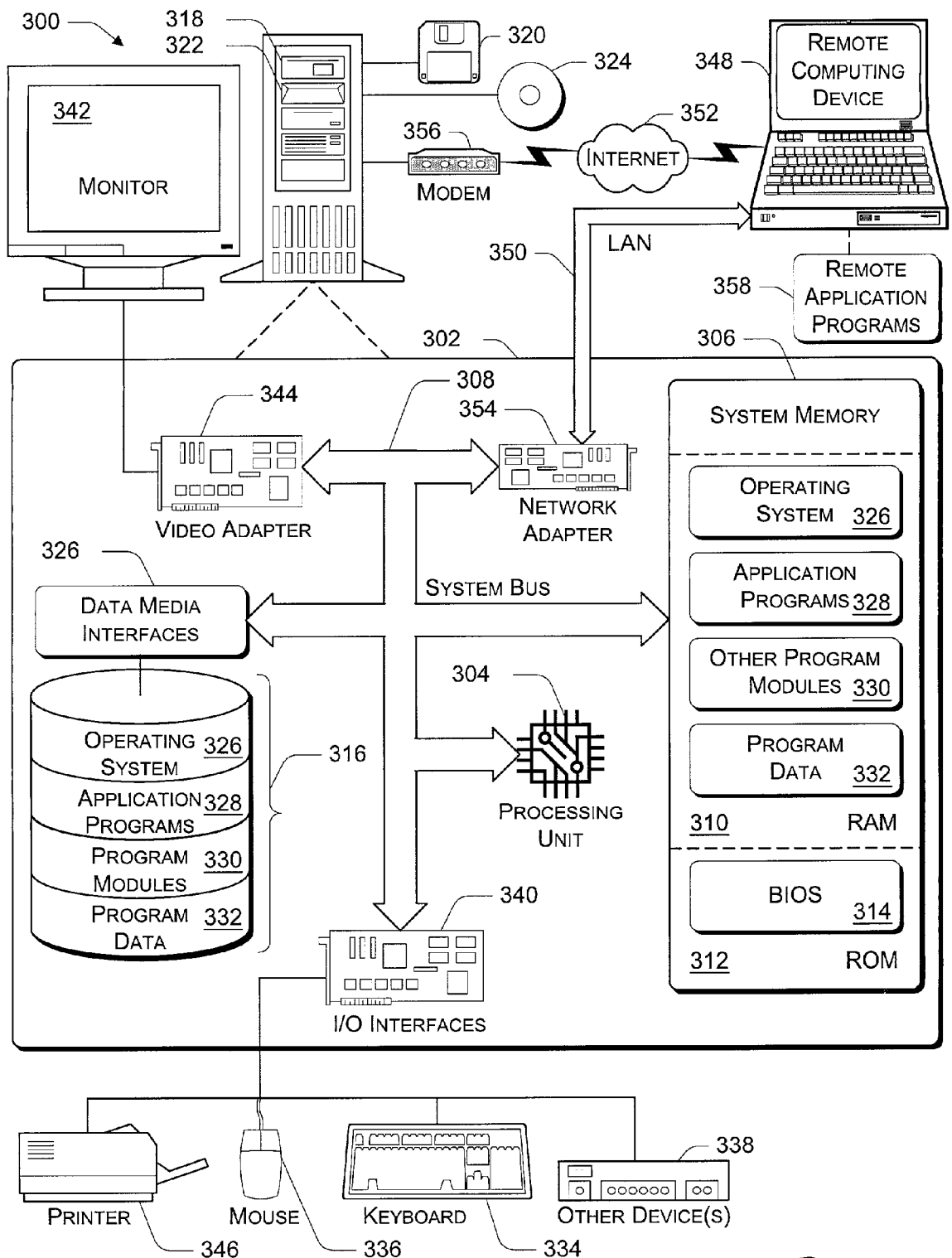
FIG. 5 illustrates a more general exemplary computer environment, which can be used to implement client and server devices described herein.

FIG. 5 illustrates a more general exemplary computer environment 300, which can be used to implement the improved meta data management described herein. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the exemplary computer environment 300.

Computer environment 300 includes a general-purpose computing device in the form of a computer 302. Computer 302 can be, for example, any of computing devices 102 or 104 of FIG. 1. The components of computer 302 can include, but are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 5 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disc drive 322 for reading from and/or writing to a removable, non-volatile optical disc 324 such as a CD-ROM, DVD-ROM, or other optical media. The hard disk drive 316, magnetic disk drive 318, and optical disc drive 322 are each connected to the system bus 308 by one or more data media interfaces 326. Alternatively, the hard disk drive 316, magnetic disk drive 318, and optical disc drive 322 can be connected to the system bus 308 by one or more interfaces (not shown).

The various drives and their associated computer-readable media provide non-volatile storage of computer readable instructions, data structures, program modules, and other data for computer 302. Although the example illustrates a hard disk 316, a removable magnetic disk 320, and a removable optical disc 324, it is to be appreciated that other types of computer readable media which can store data that is accessible by a computer, such as magnetic cassettes or other magnetic storage devices, flash memory cards, CD-ROM, digital versatile discs (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 316, magnetic disk 320, optical disc 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are exemplary and that other means of establishing communication link (s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor (s) of the computer.

Computer 302 typically includes at least some form of computer readable media. Computer readable media can be any available media that can be accessed by computer 302. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other media which can be used to store the desired information and which can be accessed by computer 302. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor (s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A system comprising:
a server device including a DVD drive, wherein the server device further includes a key exchange server, and wherein a DVD is accessible to the DVD drive;
a client device coupled to the server device via a network, the client device including a key exchange client and a decoder; and
wherein the key exchange client and the key exchange server communicate with one another to pass one or more keys from the DVD to the key exchange client to allow the decoder to decrypt content received, via the network, from the DVD, the one or more keys from the DVD also usable to verify authenticity of the DVD drive and wherein at least one of the keys is specific to a media content player incorporating the decoder, and wherein the server device obtains, based on information received from the client device, the appropriate key for the media content player.

2. A system as recited in claim 1, wherein the server device comprises a DVD changer containing a plurality of DVDs.

3. A system as recited in claim 1, wherein the decoder has no knowledge that the DVD drive is included as part of the server device.

4. A system as recited in claim 1, wherein the key exchange server comprises a remote procedure call (RPC) server.

5. A system as recited in claim 1, wherein the key exchange client comprises a DirectShow® application programming interface filter.

6. A system as recited in claim 1, wherein the network comprises a public network.

7. A system as recited in claim 1, wherein the network comprises a home network.

8. A system as recited in claim 1, wherein the one or more keys are used for Content Scrambling System (CSS) protected content.

9. A system as recited in claim 1, wherein the decoder is implemented as part of the media content player that is implemented completely on the client device.

10. A system as recited in claim 1, wherein the server device further passes, to the key exchange client, region information from the DVD.

11. A system as recited in claim 1, wherein both the server device and the client device execute a Windows® operating system.

12. A method implemented on a server device, the method comprising:
receiving a request, from a remote client computing device, to obtain one or more keys located on a removable storage medium readable by the server device, wherein the one or more keys are for decrypting content on the removable storage medium and for verifying authenticity of a DVD drive used to replay the content on the removable storage medium, wherein at least one of the keys is specific to a media content player incorporating a decoder and wherein the server device obtains, based on information received from the remote client device, the appropriate key for the media content player;
obtaining the one or more keys from the removable storage medium; and
communicating the one or more keys to the remote client computing device.

13. A method as recited in claim 12, wherein the server device comprises a computing device executing a Window® operating system.

14. A method as recited in claim 12, wherein the server device comprises a multi-DVD changer.

15. A method as recited in claim 12, wherein the remote client computing device comprises a computing device executing a Windows® operating system.

16. A method as recited in claim 12, wherein the receiving comprises receiving, as a remote procedure call (RPC) message, the request.

17. One or more computer-readable memories containing a computer program that is executable by a processor, the processor performing the method comprising:
receiving a request, from a remote client computing device, to obtain one or more keys located on a removable storage medium readable by the server device, wherein the one or more keys are for decrypting content on the removable storage medium and for verifying authenticity of a DVD drive used to replay the content on the removable storage medium, wherein at least one of the keys is specific to a media content player incorporating a decoder and wherein the server device obtains, based on information received from the remote client device, the appropriate key for the media content player;
obtaining the one or more keys from the removable storage medium; and
communicating the one or more keys to the remote client computing device.

18. A method implemented on a computing device, the method comprising:
receiving, from a media content player executing on the computing device, a request to perform at least part of a key exchange process with a disc drive in order to decode media content on a disc accessible to the disc drive; and
communicating, with a remote server at which the disc drive is located, to obtain one or more keys from the disc that can be used at the computing device to decode the particular media content, the one or more keys from the disc also usable to verify authenticity of the disc drive, wherein at least one of the keys is specific to the media content player incorporating a decoder, and wherein the remote server obtains, based on information, received from the computing device, the appropriate key for the media content player.

19. A method as recited in claim 18, wherein the disc comprises an optical disc.

20. A method as recited in claim 18, wherein the media player has no knowledge that the disc drive is located at the remote server.

21. A method as recited in claim 18, wherein the method is implemented as a DirectShow® application programming interface filter.

22. One or more computer-readable memories containing a computer program that is executable by a processor, the processor performing the method comprising:
   receiving, from a media content player executing on the computing device, a request to perform at least part of a key exchange process with a disc drive in order to decode media content on a disc accessible to the disc drive; and
   communicating, with a remote server at which the disc drive is located, to obtain one or more keys from the disc that can be used at the computing device to decode the particular media content, the one or more keys from the disc also usable to verify authenticity of the disc drive, wherein at least one of the keys is specific to the media content player incorporating a decoder, and wherein the remote server obtains, based on information received from the computing device, the appropriate key for the media content player.

23. A system comprising:
   a server device including a DVD drive, wherein the server device further includes a key exchange server, and wherein a DVD is accessible to the DVD drive;
   a client device coupled to the server device via a network, the client device including a key exchange client and a decoder; and
   wherein the key exchange client and the key exchange server communicate with one another keys from the DVD to the key exchange client, at least one of the keys to allow the decoder to decrypt content received, via the network, from the DVD, and another of the keys is specific to a media content player incorporating the decoder, and wherein the server component obtains, based on information received from the client component, an appropriate key for the media content player and wherein at least one of the keys is specific to the media content player incorporating the decoder, and wherein the server device obtains, based on information received from the client device, the appropriate key for the media content player.

* * * * *